United States Patent
Etemad et al.

(10) Patent No.: US 7,848,655 B2
(45) Date of Patent: Dec. 7, 2010

(54) MODE-LOCKED OPTICAL AMPLIFIER AS A SOURCE FOR A WDM-WDM HIERARCHY ARCHITECTURE

(75) Inventors: Shahab Etemad, Warren, NJ (US); Peter Delfyett, Geneva, FL (US)

(73) Assignees: Telcordia Technologies, Inc., Piscataway, NJ (US); University of Central Florida, Orlando, FL (US)

( * ) Notice: Subject to any disclaimer, the term of this patent is extended or adjusted under 35 U.S.C. 154(b) by 785 days.

(21) Appl. No.: 10/928,897

(22) Filed: Aug. 27, 2004

(65) Prior Publication Data

US 2005/0069320 A1    Mar. 31, 2005

Related U.S. Application Data

(60) Provisional application No. 60/498,512, filed on Aug. 28, 2003.

(51) Int. Cl.
 *H04B 10/00* (2006.01)
(52) U.S. Cl. .................. 398/141; 398/144; 398/201; 398/79
(58) Field of Classification Search .......... 398/182–201
 See application file for complete search history.

(56) References Cited

U.S. PATENT DOCUMENTS

| | | | | |
|---|---|---|---|---|
| 5,229,876 A | * | 7/1993 | Fatehi et al. | 398/157 |
| 5,502,588 A | * | 3/1996 | Abram | 398/146 |
| 5,646,774 A | * | 7/1997 | Takara et al. | 359/340 |
| 5,786,918 A | * | 7/1998 | Suzuki et al. | 398/98 |
| 5,828,680 A | * | 10/1998 | Kim et al. | 372/18 |
| 5,907,421 A | * | 5/1999 | Warren et al. | 398/188 |
| 5,963,567 A | * | 10/1999 | Veselka et al. | 372/21 |
| 6,018,536 A | * | 1/2000 | Alphonse | 372/23 |
| 6,081,355 A | * | 6/2000 | Sharma et al. | 398/90 |
| 6,211,985 B1 | * | 4/2001 | Anderson | 398/38 |
| 6,388,782 B1 | * | 5/2002 | Stephens et al. | 398/79 |
| 6,388,803 B1 | * | 5/2002 | Knox | 359/337.1 |
| 6,400,872 B1 | * | 6/2002 | Gehler | 385/39 |
| 6,459,522 B2 | * | 10/2002 | Yariv | 359/264 |
| 6,763,197 B1 | * | 7/2004 | Hirano et al. | 398/192 |
| 6,804,471 B1 | * | 10/2004 | Ionov et al. | 398/187 |
| 6,819,837 B2 | * | 11/2004 | Li et al. | 385/39 |
| 6,901,174 B2 | * | 5/2005 | Gupta | 385/1 |
| 6,970,654 B1 | * | 11/2005 | Paglione et al. | 398/182 |
| 6,996,136 B1 | * | 2/2006 | Carruthers et al. | 372/6 |
| 7,127,168 B2 | * | 10/2006 | Kani et al. | 398/79 |
| 7,218,862 B2 | * | 5/2007 | Shahar et al. | 398/141 |
| 7,327,957 B2 | * | 2/2008 | Lee et al. | 398/82 |
| 2001/0055138 A1 | * | 12/2001 | Richardson et al. | 359/173 |
| 2002/0063944 A1 | * | 5/2002 | Kim et al. | 359/326 |

\* cited by examiner

*Primary Examiner*—Agustin Bello
(74) *Attorney, Agent, or Firm*—Philip J. Feig

(57) ABSTRACT

The present invention relates to advances in the field of reconfigurable optical networks. In particular, the present invention provides improvements in the technology of light sources for use in optical networks. The optical network according to the present invention includes a single light source that can be used to emit all of the bands and channels needed for transmission. In particular, the single light source in the optical network of the present invention is a mode-locked laser.

18 Claims, 6 Drawing Sheets

MODE-LOCKED OPTICAL AMPLIFIER AS A SOURCE FOR A WDM-WDM HIERARCHY ARCHITECTURE

CROSS REFERENCE TO RELATED APPLICATIONS

This Application is related and claims priority to provisional patent application Ser. No. 60/498,512 filed on Aug. 28, 2003.

GOVERNMENT LICENSE RIGHTS

This invention was made with Government support under Agreement No. MDA972-03-C-0078 awarded by DARPA. The Government has certain rights to the invention.

FIELD OF THE INVENTION

The present invention relates to advances in the field of reconfigurable optical networks. In particular, the present invention provides improvements in the technology of light sources for use in optical networks.

BACKGROUND

Optical networks provide a means of transporting data for communication purposes. Optical networks generally comprise a set of point-to-point transparent optical nodes connected by a transparent media, e.g. optical fiber or free space; each node comprising a transmitter and a corresponding receiver.

There are two primary advantages in using optical networks rather than electrical networks. A higher bandwidth or data rate is available in optical networks because of the higher carrier frequency. Further, longer communications distances are possible in an optical network because of the low attenuation of fiber optics and/or free space in an optical network can spread over thousands of miles without a need for regeneration, although optical to electrical to optical steps are needed to boost the signal to noise ratio.

In order to increase existing optical network capacity and avoid the need to install more fiber, the technique of Wavelength Division Multiplexing (WDM) has been developed. WDM is a means of increasing the data-carrying capacity of an optical fiber by concurrently transmitting different signals having different wavelengths through the same fiber. This is similar to Frequency Division Multiplexing (FDM) used in the analogous electrical and radio transmission systems. WDM comprises any technique by which two or more optical signals having different wavelengths are simultaneously transmitted in the same direction over one strand of optical fiber and then separated by wavelength at the distant end. Each wavelength can be thought of as a virtual channel, or a light pipe, which can support a given signaling rate.

Other techniques in the area of traffic grouping or wave banding, both for architectural reasons and as a means to reduce the number of ports in optical cross connects wherever different traffic can share the same port are being explored. However, wave banding architectures generally require individual transmitters be assigned to each channel, just as in the case for WDM optical networks.

One major disadvantage in current WDM optical networks is that every optical channel requires its own light source. For example, in a network designed for M bands, each containing N channels, M×N fixed lasers are required as light sources. The necessity of individual light sources increases the cost of providing adequate optical networks, as well as the operational cost of maintaining the networks. For example, there is a high cost associated with the need to inventory and provision the optical network with sources for each optical channel. To partially reduce such inventory and provisioning costs, tunable lasers may be used. However, even using tunable lasers would require one type of laser be inventoried for each channel; e.g. N tunable lasers in the example above.

Therefore, there remains a need in the art for improvements in the provision of light sources for optical networks.

SUMMARY

The present invention overcomes the problems noted above associated with current optical networks. In particular, the present invention shows how a mode-locked laser can be used as a single light source that can be used to emit all of the bands and channels for the network. In particular, a single mode-locked laser can replace N tunable lasers or M×N individual lasers, at substantial provisioning and operational savings.

In one embodiment of the present invention, a mode-locked external cavity fiber ring laser which includes a semiconductor optical amplifier (SOA) or an optical fiber amplifier (OFA) is used as the light source.

DETAILED DESCRIPTION OF THE DRAWINGS

The present invention describes an optical network having a single light source that can be used to emit all of the bands and channels, one band at a time. In particular, the present invention uses a mode-locked external cavity ring and monolithic semiconductor lasers as a multirange wavelength selectable source with tunable optical granularity as the light source for an optical network. The light source of the present invention emits a tunable wave band containing ultra-dense individually selectable micro wavelength channels. In addition, by using a mode-locked laser as described in the present invention, the separation between channels; i.e. the optical granularity, is also tunable, which allows variations of the number of channels within a given band. In accordance with the present invention, in an architecture having M wave bands and N channels, it is possible to replace the N×M individual sources or the N tunable lasers noted above, with a single light source, resulting in substantial cost and provisioning savings. In addition, significant savings in operations from inventory and provisioning by using a single type light source can be realized.

Figure 1:
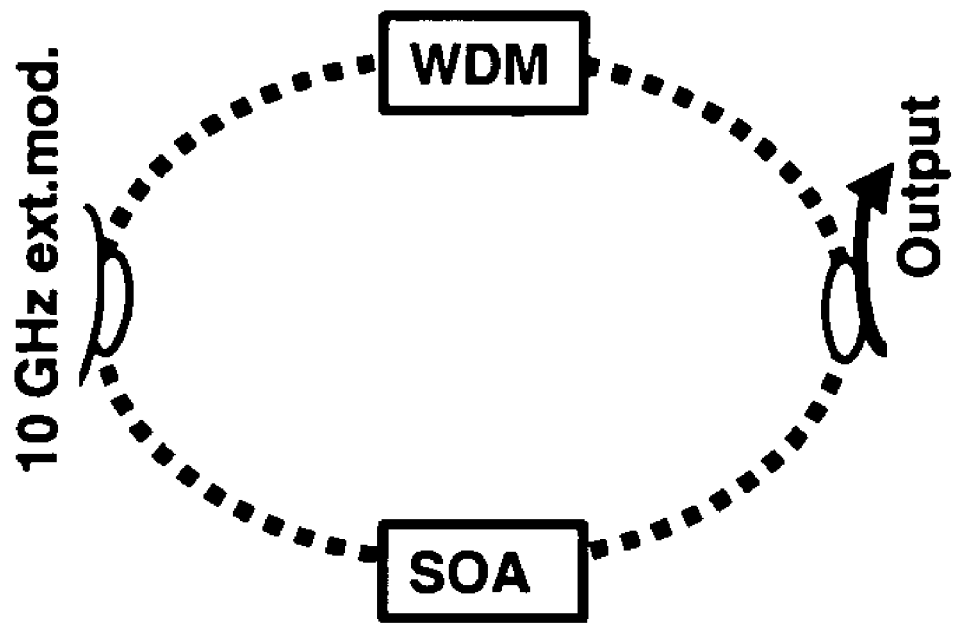
FIG. 1 shows a mode-locked external cavity fiber ring laser in accordance with one embodiment of the present invention.

FIG. 1 shows a mode-locked external cavity fiber ring laser in accordance with the present invention. The laser comprises a gain medium, such as a semiconductor optical amplifier (SOA) or an optical fiber amplifier, e.g. an erbium-doped fiber amplifier (EDFA); an external modulator to tune the modulation rate of the gain to a resonance mode of the cavity; a WDM filter to limit the gain to a predefined spectral range and a tap to channel the output. The cavity length depicted by the dotted line is typically several meters. The mode-locked laser shown in FIG. 1 serves as a light source for all channels of the optical network. The modulator allows for tunable optical granularity while the WDM filter provides tenability of the wave band and increases the intensity of individual channels.

Figure 2:
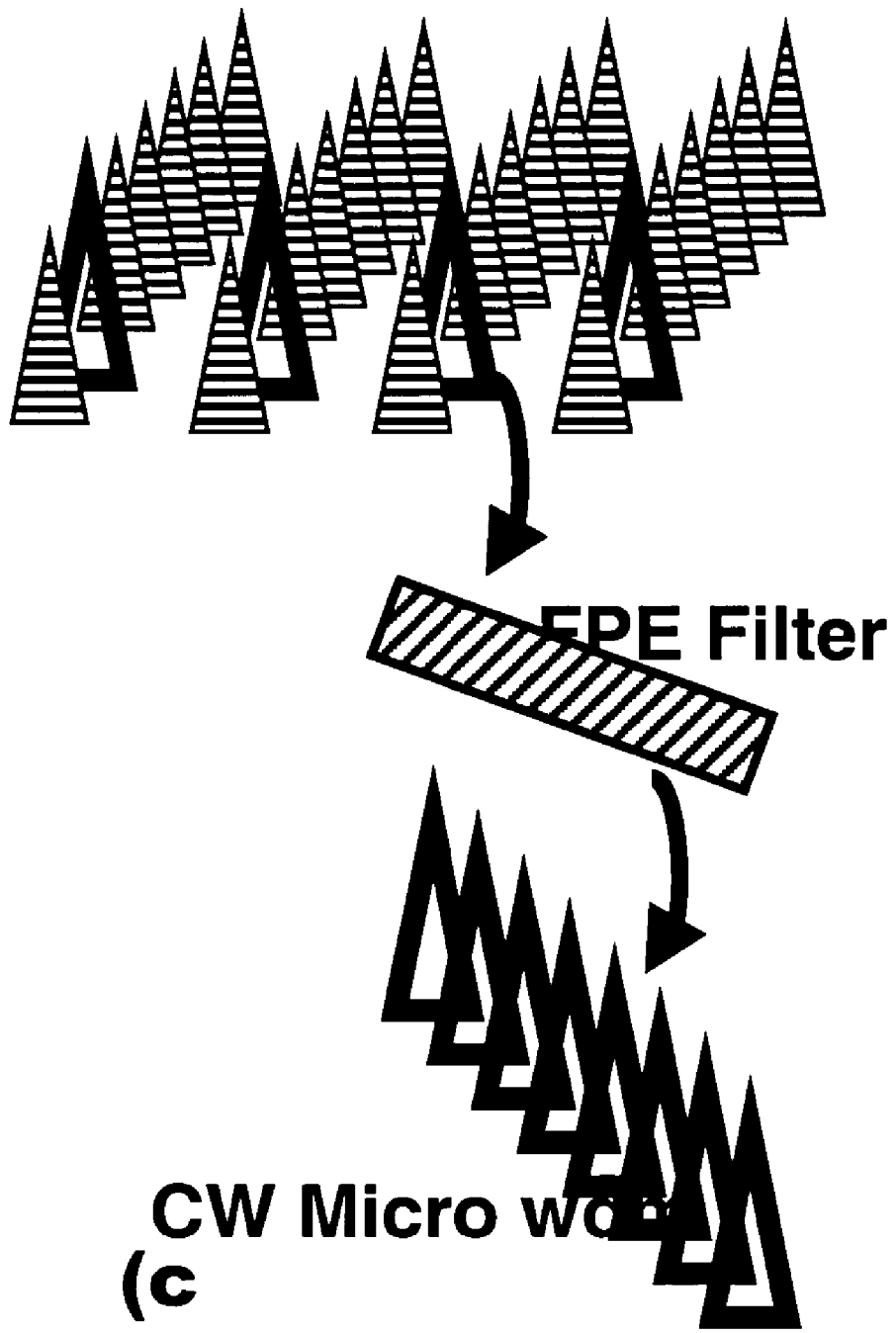
FIG. 2 depicts the time and wavelength variation of the output from the lasers shown in FIG. 1.

FIG. 2 depicts the time and wavelength variation of the output from the mode-locked laser shown in FIG. 1. In the time domain, one sees periodic transform limited pulses of light whose time resolution is limited by the spectral range of the gain medium. In the wavelength domain each pulse contains the "longitudinal" cavity modes coupled (phase locked) and separated by the driving frequency of the external modulator. The spectral content of the macro pulse can be adjusted by a macro WDM filter situated inside the cavity. The micro wavelength channel can be extracted by a well-designed high resolution filter such as a Hyperfine filter, either free space or ring-resonator-based, or a Fabry Perrot Ethalon (FPE) filter. By using such a filter, it is possible to select an individual "longitudinal" mode from the phase-locked ensemble that constitute the mode locked pulse. This longitudinal mode is a continuous wave (CW) suitable carrier and can be modulated by a data stream, and is therefore very useful for generating a tunable band of ultra dense, but not necessarily large channel number, in optical networking applications.

Figure 3:
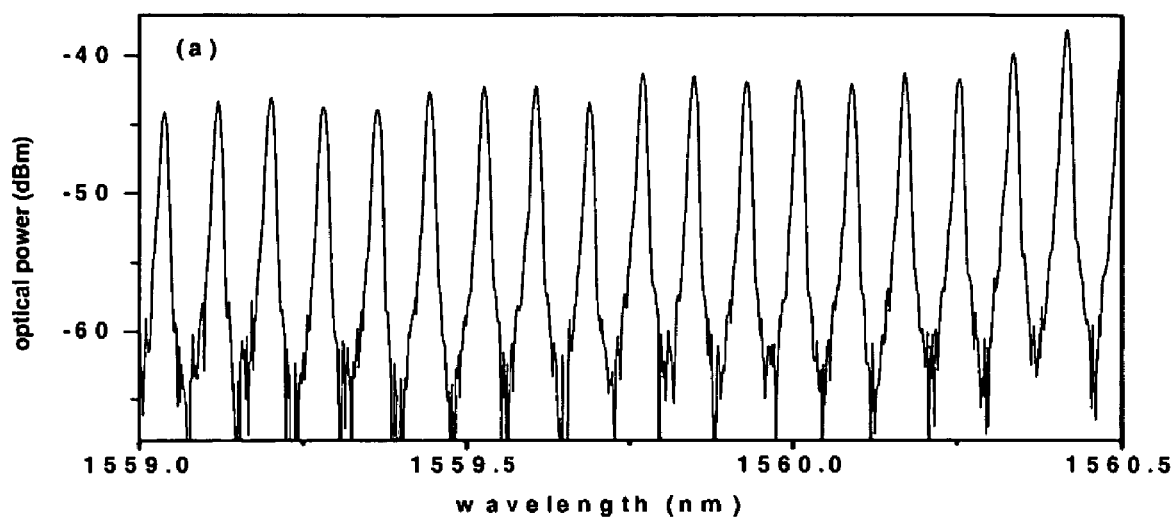
FIG. 3 shows the high-resolution optical spectrum of the laser shown in FIG. 1, but without the WDM filter.

FIG. 3 shows the high-resolution optical spectrum of a mode-locked ring laser described in FIG. 1 but without the WDM filter. This optical spectrum illustrates the equal spacing and almost equal amplitude obtained by using a mode-locked ring laser. In this case, the mode locking has been stabilized by fine tuning the driving frequency to within 1 kHz of the free spectral range (FSR~11 GHz) of the FPE filter inside the cavity of the laser. In addition, the extraneous cavity modes of the mode-locked ring laser are successfully suppressed. FIG. 3 shows a 1.5 nm range including 18 micro wavelengths, only a part of a total of about 40 micro wavelengths making up the entire macro pulse. By limiting the gain spectrum and decreasing the number of micro wavelengths, the intensity of the micro wavelengths is increased.

Figure 4:
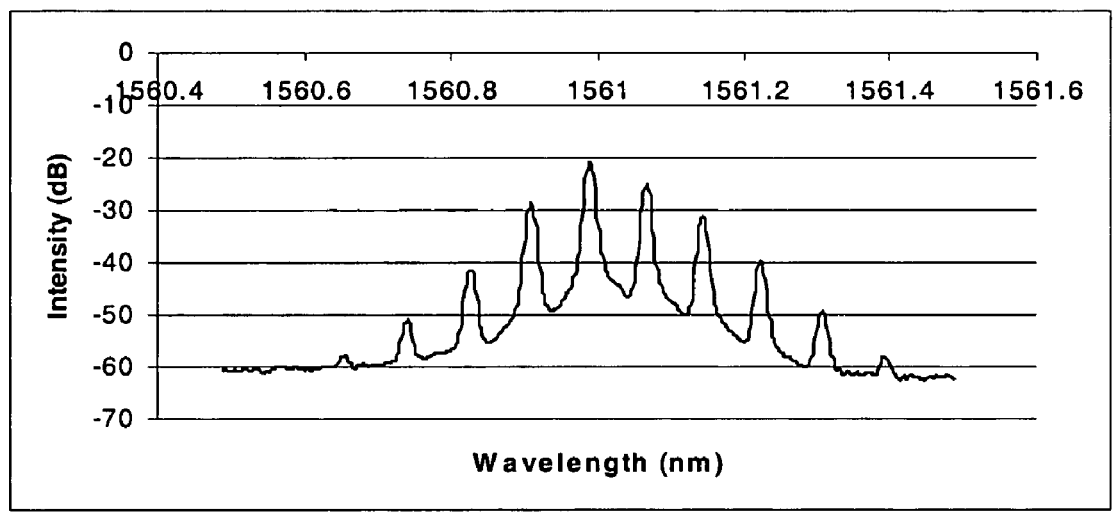
FIG. 4 shows the high-resolution optical spectrum of the mode-locked ring laser of FIG. 1, with a tunable WDM filter in the cavity.

FIG. 4 shows the high resolution (0.01 nm) optical spectrum of a mode locked ring laser of FIG. 1, with a tunable ~1 nm WDM filter in the cavity. The filter was tuned to the second window of the MONET/ATD Net experimental test bed. By limiting the gain, the intensity of the micro wavelengths within the macro pulse tunable window was increased.

Figure 5:
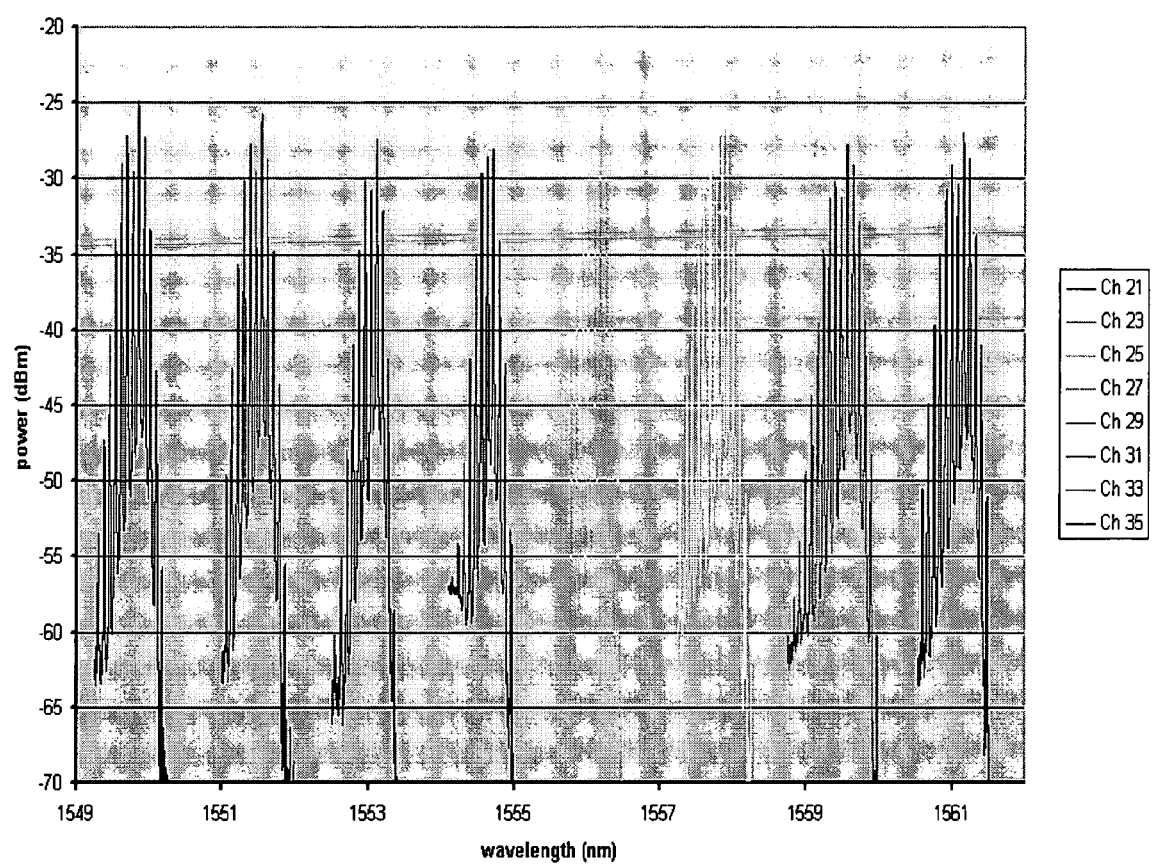
FIG. 5 shows tunability of a mode-locked laser in accordance with the present invention.

FIG. 5 shows tunability of a modelocked laser according to the present invention. By changing the window of the 1 nm WDM filter in the cavity, it is possible to cover operation in all eight transparent windows of the MONET/ADT Net. It is demonstrated that a single laser can generate N channels in any of M bands.

Figure 6:
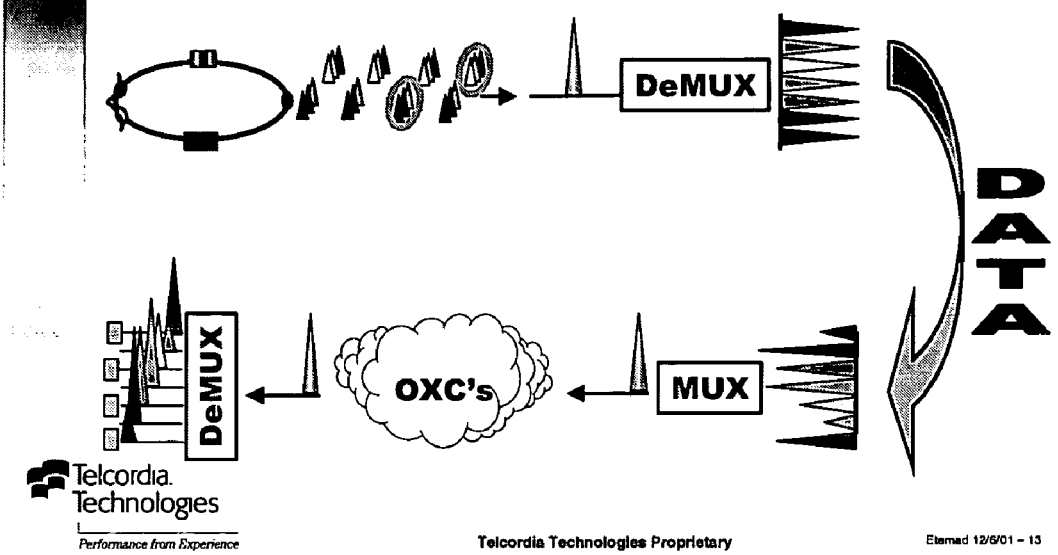
FIG. 6 shows a network architecture in accordance with the present invention.

FIG. 6 shows a hierarchical architecture according to the present invention, including a mode-locked laser that emits pulsed macropulses containing N continuous wave channels. The circled wave channels indicate that such channels may be within any of the M WDM windows. A chosen channel is transmitted through a DeMUX, a high resolution optical demultiplexer, such as a Hyperfine Optical-DeMUX based interferometric free space optics available from Essex Corporation, or serial optical filtering operation of ring resonators. Data is then imparted on each channel using external modulators and the N channels are combined through a MUX, such as a simple N×1 combiner or second DeMUX in reverse. The resultant macropulse containing data in each of the its N channels is routed through the network of transparent optical cross connects (OXC). Finally, at the receiving node the data carrying macropulse is optically demultiplexed by another DeMUX and individual channels are fed to their respective receivers.

In accordance with the present invention the micro wavelengths can be used as carriers for high bit rate transmission in an optical network architecture. By using a mode-locked laser, in accordance with the present invention, in such a network, a band of micro wavelengths are generated by a single source. Individual micro wavelengths are then separated and modulated using external modulators then recombined and routed together through the network. By using a "Hyperfine" optical demultiplexer with demonstrated channel to channel resolution less than 1 GHz the loss in splitting and recombining the micro wavelengths will be reduced substantially. Thus, obtaining a higher number of channels in a given band is possible. Because all of the micro wavelengths are generated by the same source, the present invention has the advantage of not being affected by polarization drift associated with wave banding schemes using individual sources. Further, the present invention reduces operational costs, by reducing inventory and provisioning needs. In particular, inventory and provisioning are much easier to handle since the same single source is used at every node. In addition, because the optical granularity of the single source according to the present invention can be tuned to less than 1 GHz and because each micro wavelengths can be accessed, a new networking architecture based on optical grooming where the network can allocate each user a wavelength rather than a time slot is possible. Such an architecture would be less susceptible to network impairments, chromatic dispersion and polarization mode dispersions compared to a high speed optical network of the same capacity but using one wavelength. In short, the same throughput can be achieved at lower data rates.

It is anticipated that other embodiments and variations of the present invention will become readily apparent to the skilled artisan in the light of the foregoing specification. Such embodiments and variations are intended to likewise be included within the scope of the invention as set out in the appended claims.

What is claimed is:

1. An optical communications network comprising:
   a light source consisting of a stabilized mode-locked laser capable of emitting a comb of equally spaced phase locked cw laser lines of comparable amplitude within a tunable WDM waveband;
   a plurality of transmitting stage of high resolution optical DeMUX each capable of selecting one and only one of the cw laser lines;
   plurality of data modulators for imparting data on each of the cw laser lines;
   an optical MUX to combine modulated laser lines within the said tunable WDM waveband;
   a transparent optical network to route the WDM waveband; and
   a plurality of receiving stage of high resolution optical DeMUX each capable of selecting one of the data modulated laser lines for its assigned receiver.

2. A network according to claim 1, wherein all said comb of data carrying laser lines travel through the same port of said network.

3. A network according to claim 1, wherein at least one laser line from the comb of said WDM waveband is used to monitor optical performance of said network.

4. A network according to claim 3, wherein said at least one comb laser line is an end one within the waveband.

5. A network according to claim 1, wherein at least one comb-laser line of said wave band is used to route instructions for reconfigurable elements of said network.

6. A network according to claim 5, wherein said comb laser line is an end one within the waveband.

7. A network according to claim 1, wherein said first DeMUX is a high resolution filter.

8. A network according to claim 7, wherein said filter is a Hyperfine filter.

9. A network according to claim 7, wherein said filter is a Fabry-Perot Etalon filter.

10. A network according to claim 1, wherein said first DeMUX is a free space interferometric device.

11. A network according to claim 1, wherein said first DeMUX is a ring-resonator device.

12. A network according to claim 1, wherein said MUX is a DeMUX operating in reverse.

13. A network according to claim 1, wherein said MUX is a combiner.

14. A network according to claim 1, wherein spacing is controlled by adjusting the driving frequency of said mode-locked laser.

15. A network according to claim 1, wherein said means to modulate the gain medium of the mode locked laser further comprises a modulator for an optical fiber amplifier or a modulated current injection for a semiconductor optical amplifier.

16. An optical communications network as set forth in claim 1, wherein the tunable WDM waveband is located inside the mode locked laser cavity therein to limit gain to the comb spectrum and increase intensity of said comb of laser lines.

17. An optical communications network as set forth in claim 1, wherein the comb of laser lines is stabilized passively by placing a filter within the cavity of the mode-locked laser.

18. An optical communications network as set forth in claim 1, wherein the comb of laser lines is actively stabilized by Pound-Driver-Hall mechanism.

* * * * *

UNITED STATES PATENT AND TRADEMARK OFFICE
CERTIFICATE OF CORRECTION

| | | |
|---|---|---|
| PATENT NO. | : 7,848,655 B2 | |
| APPLICATION NO. | : 10/928897 | |
| DATED | : December 7, 2010 | |
| INVENTOR(S) | : Etemad et al. | |

It is certified that error appears in the above-identified patent and that said Letters Patent is hereby corrected as shown below:

In the Specification

In Column 2, Line 59, delete "N×M" and insert -- M×N --, therefor.

Signed and Sealed this
Eleventh Day of November, 2014

Michelle K. Lee
*Deputy Director of the United States Patent and Trademark Office*